L. E. WALKER.
EGG BEATER.
APPLICATION FILED JAN. 29, 1915.
1,213,561.
Patented Jan. 23, 1917.
Fig. 1.
Fig. 2.
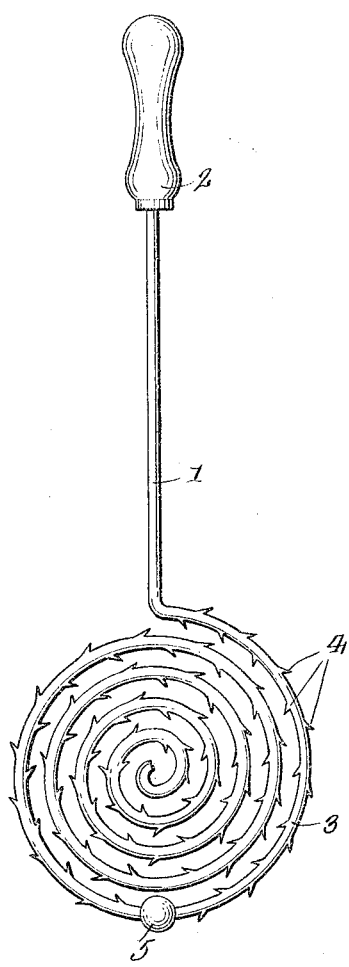
Inventor
Lena E. Walker.
Witnesses
Guy M. Spring
J. P. Campbell
By Richard Owen,
Attorney

UNITED STATES PATENT OFFICE.

LENA E. WALKER, OF FAYETTE, IOWA.

EGG-BEATER.

1,213,561. Specification of Letters Patent. Patented Jan. 23, 1917.

Application filed January 29, 1915. Serial No. 5,097.

*To all whom it may concern:*

Be it known that I, LENA E. WALKER, a citizen of the United States, residing at Fayette, in the county of Fayette and State of Iowa, have invented certain new and useful Improvements in Egg-Beaters, of which the following is a specification.

My invention relates to new and useful improvements in kitchen utensils, and more particularly to an egg beater.

The primary object of the invention is the provision of a device of this character which is simple and inexpensive in construction yet of sufficient strength to do its work properly.

A further object of the invention is the provision of a device of this character so constructed that it will readily break an egg when beating.

A still further object of the invention is the provision of means whereby the beater may be either reciprocated or rotated.

With these and other objects in view the invention consists in the novel details of construction and arrangement of parts which will be more clearly understood from the following description and drawings, in which, Figure 1 is a view in side elevation, and Fig. 2 is an end view.

In the drawings, the numeral 1 indicates a wire having the handle 2 secured to one end and the opposite end is bent to form a vertical coil 3 having spaces between the strands and said coil having a plurality of projections or barbs 4 thereon. A ball is formed on the outer strand of the coil, as indicated at 5, and the purpose of which will be presently described.

From the above detail description it will be seen that I have provided an egg beater which is very simple in construction but which will readily beat the eggs. By providing the projections or barbs 4 the whites of the eggs will be easily broken and mixed with the yolks. It will further be seen that by grasping the handle the beater may be used by reciprocating or oscillating the coil through the eggs, or, if desired, the ball 5 may be placed upon the bottom of the receptacle in which the egg is being beaten and by grasping the handle 2 between the palms of the hand and rubbing the same the beater will be rotated.

Having fully described my invention what I claim as new and desire to secure by Letters Patent is:—

1. A beater of the character described comprising a rod having one end portion forming a handle extension and having the remaining portion coiled to provide a beating head extending upon opposite sides of the handle extension, that portion of the rod forming the beating head having side prongs and being provided intermediate its length with an enlargement forming a pivot point positioned beneath the handle when the beater is used in an upright position.

2. A beater of the character described comprising a rod having one end portion bent to provide a beating head having a handle extending therefrom, the bent portion of the rod being provided intermediate its length with an enlargement forming a pivot point positioned beneath the handle when the beater is used in an upright position.

In testimony whereof I affix my signature in presence of two witnesses.

LENA E. WALKER.

Witnesses:
O. W. STEVENSON,
C. R. CARPENTER.

Copies of this patent may be obtained for five cents each, by addressing the "Commissioner of Patents, Washington, D. C."